United States Patent
Scholte-Wassink

(10) Patent No.: US 11,708,817 B2
(45) Date of Patent: Jul. 25, 2023

(54) HEATING SYSTEM AND METHOD FOR A JOINTED WIND ROTOR TURBINE BLADE

(71) Applicant: General Electric Company, Schenectady, NY (US)

(72) Inventor: Hartmut Andreas Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/588,376

(22) Filed: Jan. 31, 2022

(65) Prior Publication Data
US 2022/0154700 A1 May 19, 2022

Related U.S. Application Data

(63) Continuation of application No. 16/132,732, filed on Sep. 17, 2018, now Pat. No. 11,236,733.

(51) Int. Cl.
*F03D 80/40* (2016.01)
*F03D 80/60* (2016.01)
*F03D 1/06* (2006.01)

(52) U.S. Cl.
CPC ........... *F03D 80/40* (2016.05); *F03D 1/0675* (2013.01); *F03D 80/60* (2016.05); *F05B 2240/302* (2013.01); *F05B 2260/20* (2013.01)

(58) Field of Classification Search
CPC ........ F03D 1/0675; F03D 80/30; F03D 80/40; F03D 80/60; F03D 80/00; F05B 2240/302; F05B 2260/20
See application file for complete search history.

(56) References Cited

U.S. PATENT DOCUMENTS

| | | | |
|---|---|---|---|
| 6,612,810 B1* | 9/2003 | Olsen | F03D 80/40 |
| | | | 415/908 |
| 7,922,454 B1* | 4/2011 | Riddell | F03D 1/0675 |
| | | | 416/224 |
| 9,169,830 B2* | 10/2015 | Weitkamp | F03D 1/0675 |
| 10,502,192 B2* | 12/2019 | Zhao | F03D 80/40 |
| 10,830,214 B2* | 11/2020 | Akhtar | F03D 80/30 |
| 2010/0143123 A1 | 6/2010 | Haans et al. | |
| 2011/0091326 A1 | 4/2011 | Hancock | |

(Continued)

FOREIGN PATENT DOCUMENTS

| | | |
|---|---|---|
| CA | 2228145 C | 11/2003 |
| CN | 102434405 A | 5/2012 |

(Continued)

*Primary Examiner* — Justin D Seabe
*Assistant Examiner* — Sang K Kim
(74) *Attorney, Agent, or Firm* — Dority & Manning, P.A.

(57) ABSTRACT

A jointed wind turbine rotor blade includes a first blade segment and a second blade segment. A chord-wise joint separates the first and second blade segments, wherein internal joint structure joins the first and second blade segments across the chord-wise joint. A first heating system is configured within the first blade segment, and a second heating system is configured within the second blade segment. A disconnectable coupling is configured between the first and second blade segments at the chord-wise joint to supply power or a fluid medium from the first blade segment across the chord-wise joint for use by the second heating system in the second blade segment.

11 Claims, 7 Drawing Sheets

(56) References Cited

U.S. PATENT DOCUMENTS

2015/0056074 A1* 2/2015 Veldkamp ............... F03D 80/40
  416/1
2015/0369211 A1   12/2015 Merzhaeuser
2016/0047356 A1    2/2016 Pawis et al.
2017/0314536 A1   11/2017 Zhao et al.
2018/0135596 A1    5/2018 Herrig et al.

FOREIGN PATENT DOCUMENTS

DE            19644355 A1   4/1998
EP             2957765 B1   8/2017
WO    WO2017/147698 A2      9/2017

\* cited by examiner

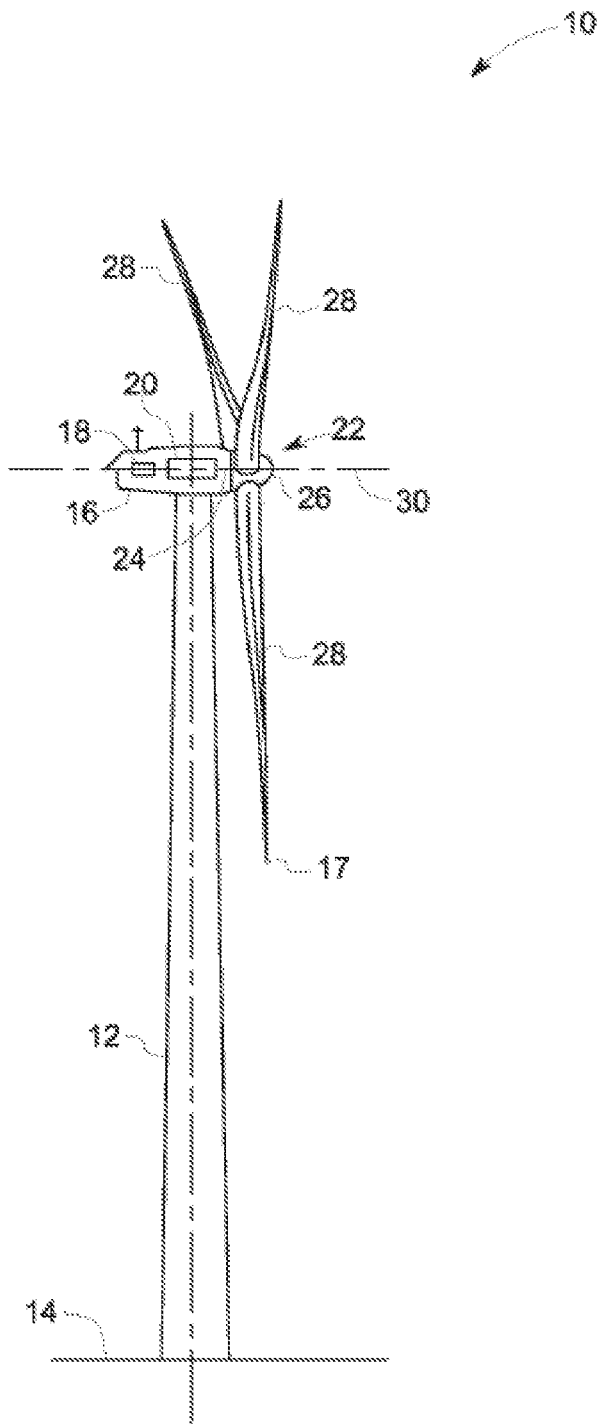
Fig. -1-

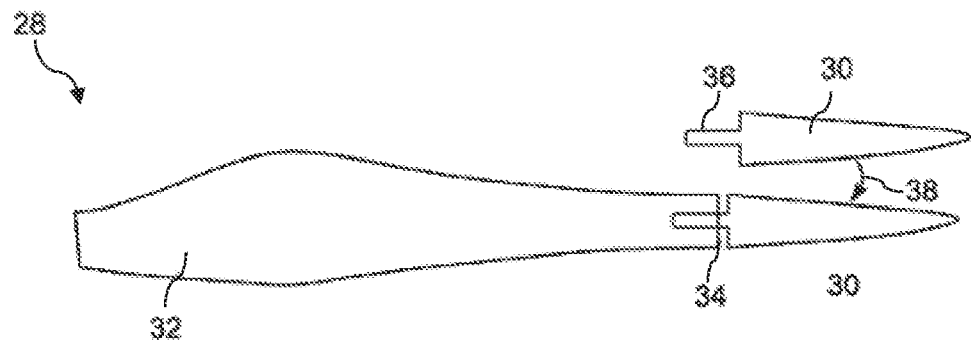
Fig. -2-
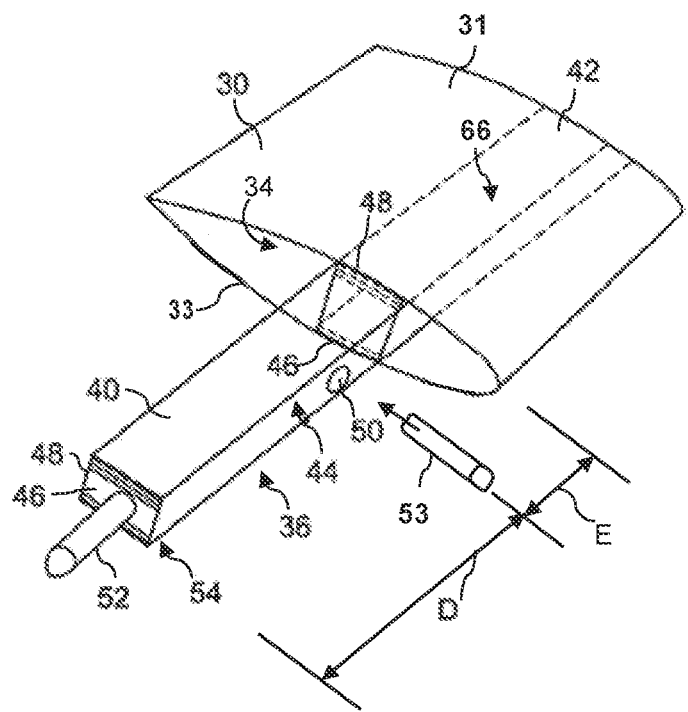
Fig. -3-

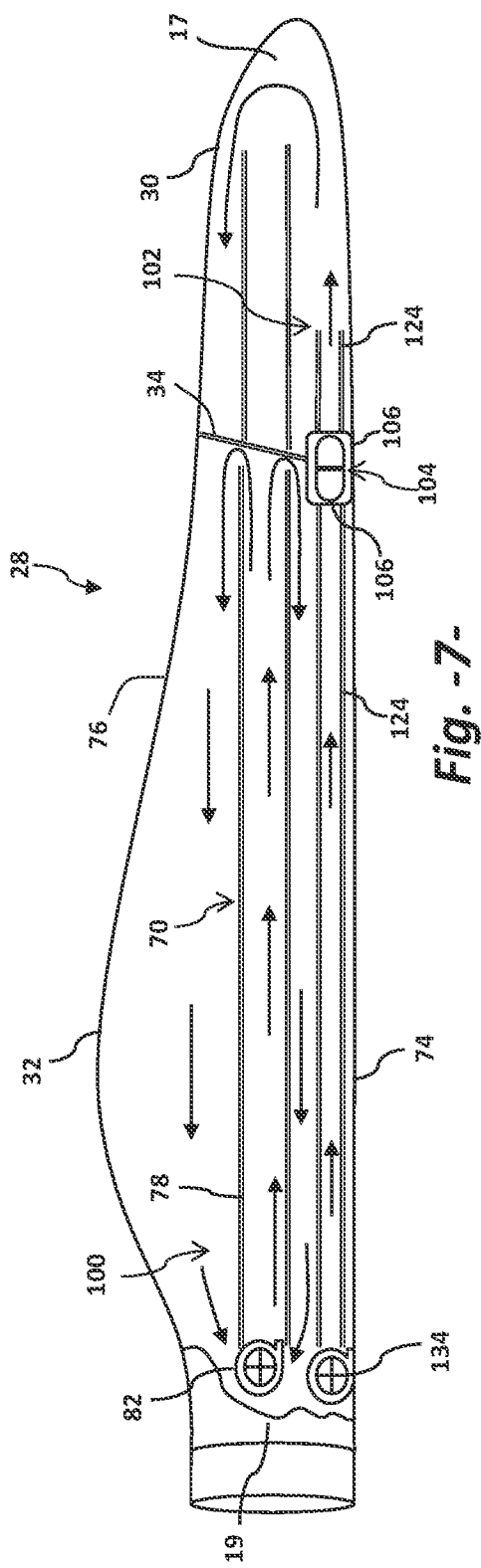
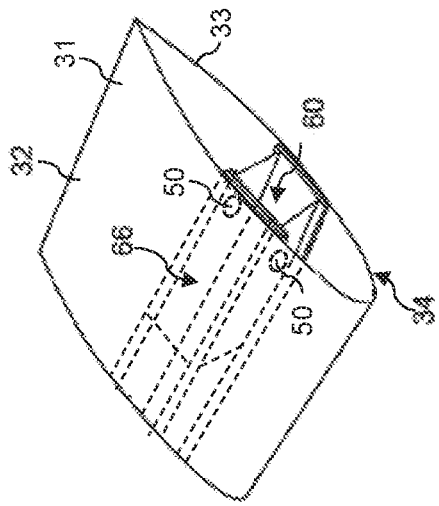
Fig. -7-
Fig. -4-

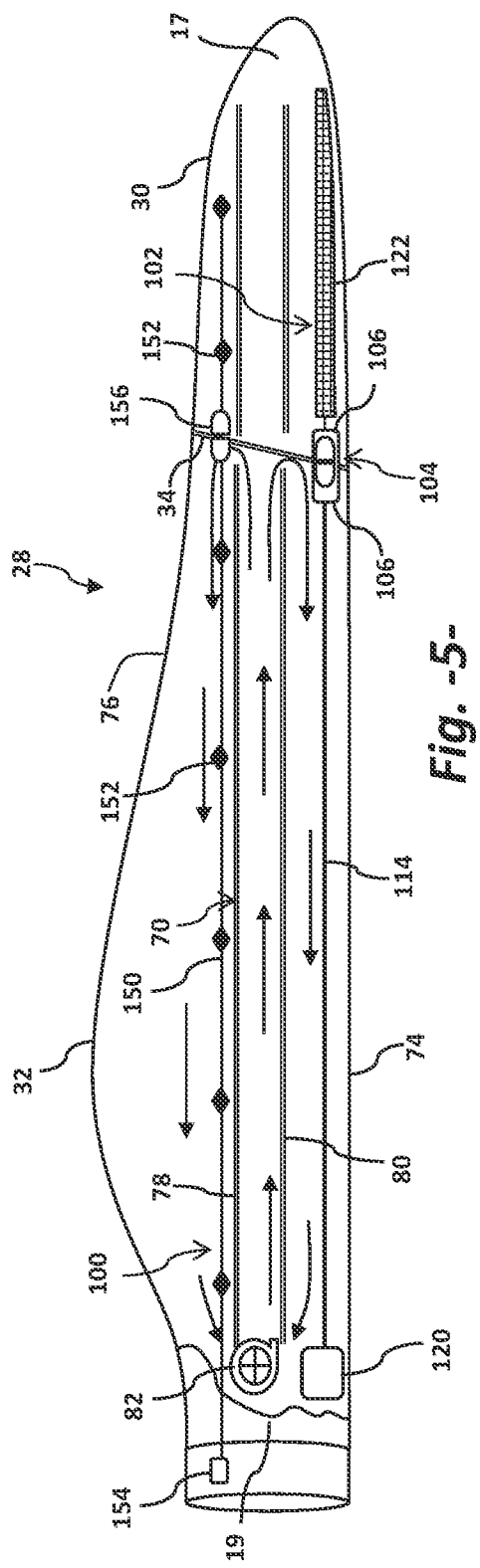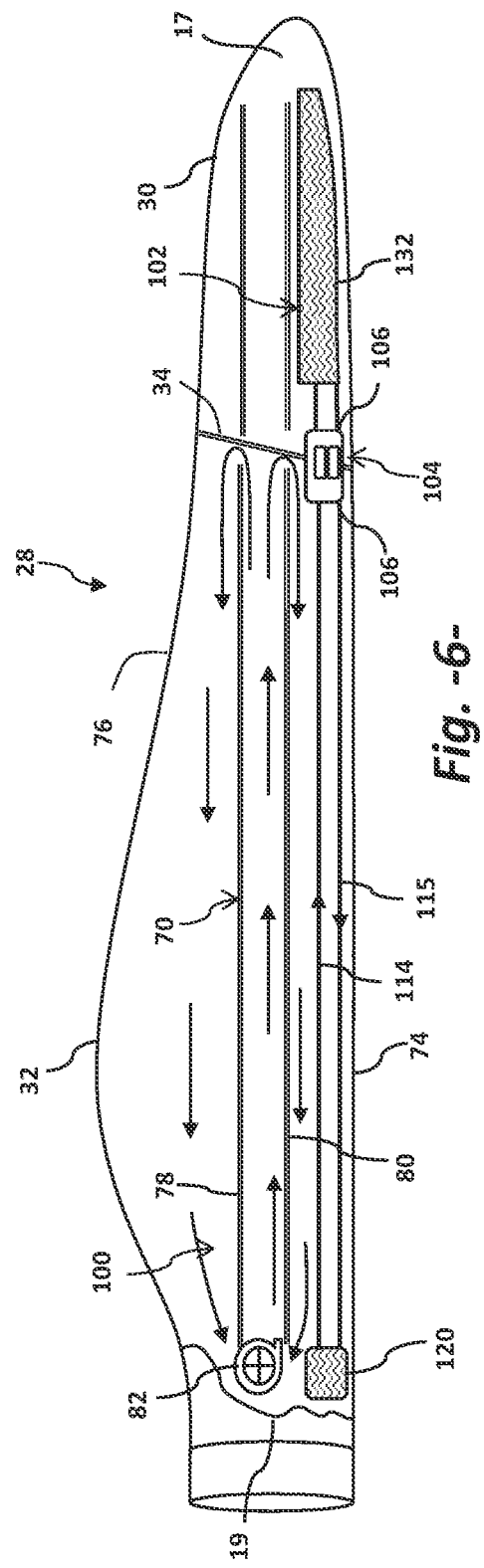

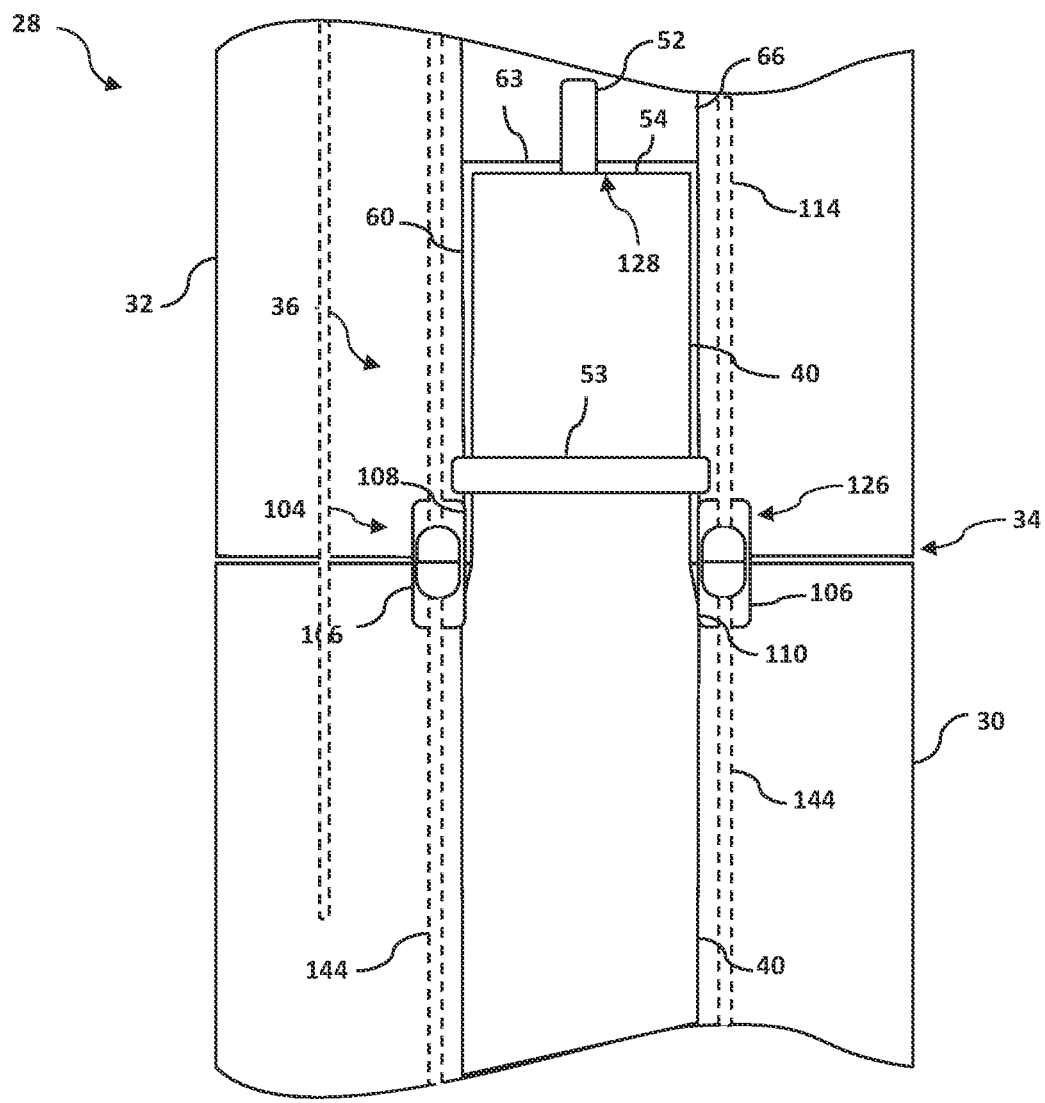
Fig. -8-

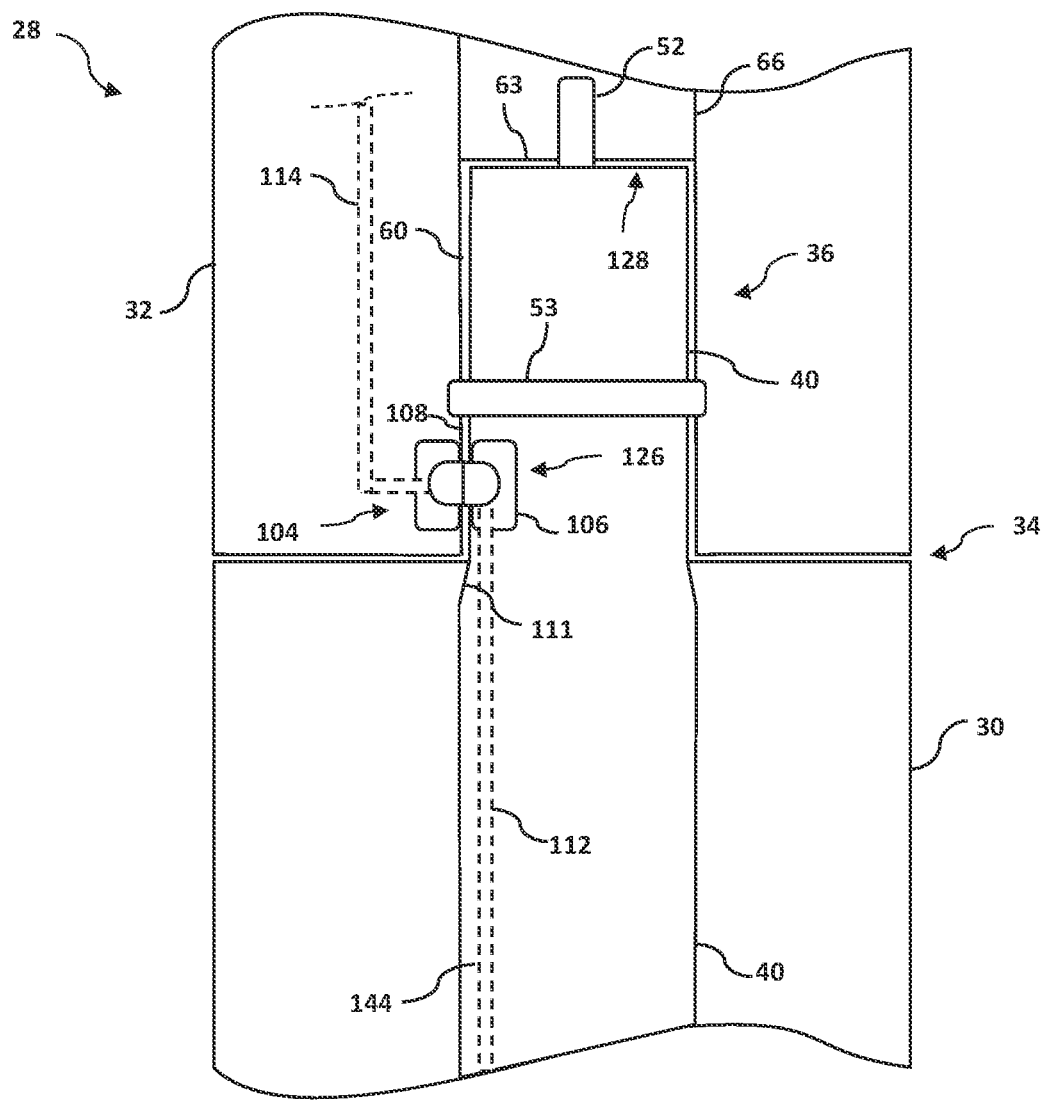
Fig. -9-

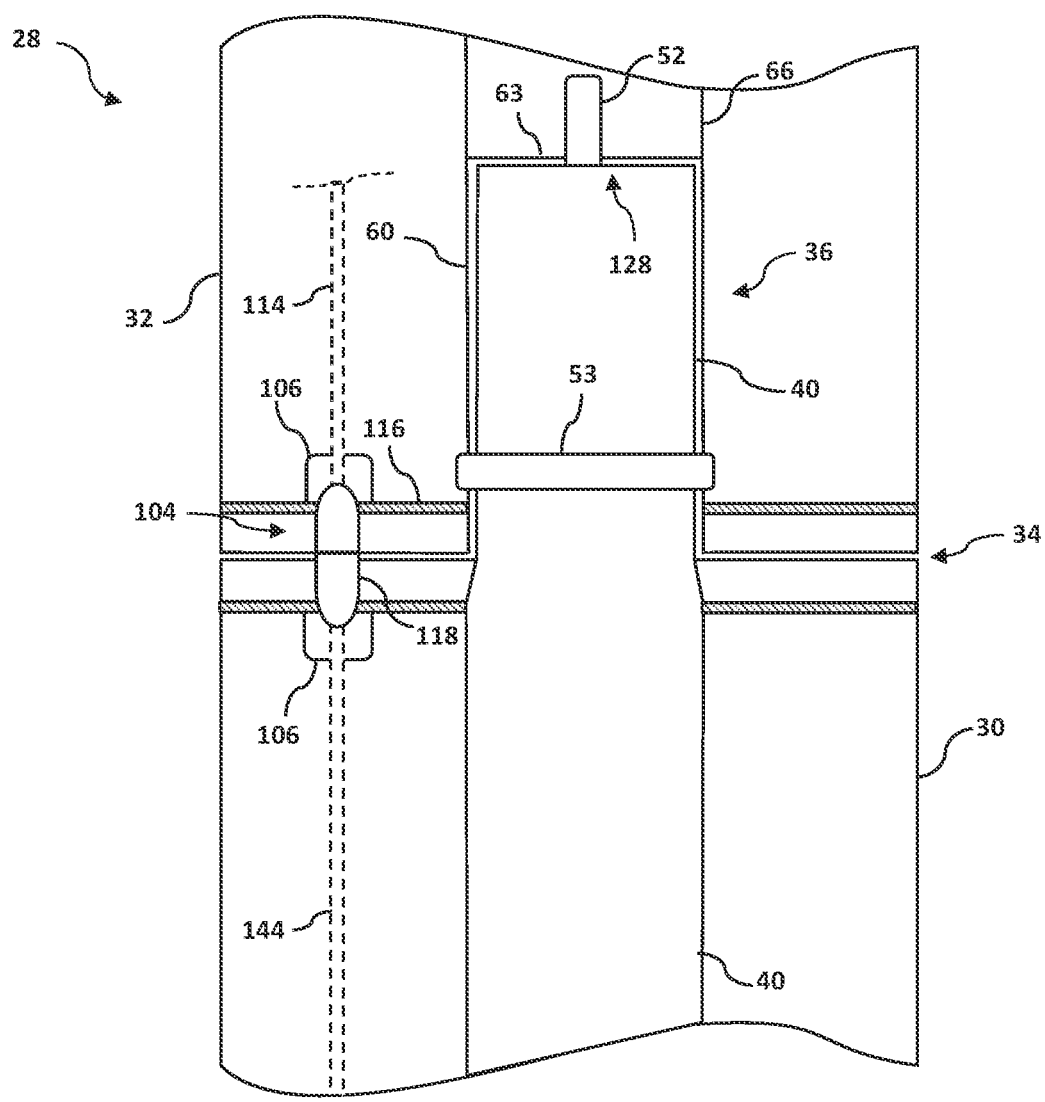
Fig. -10-

HEATING SYSTEM AND METHOD FOR A JOINTED WIND ROTOR TURBINE BLADE

RELATED APPLICATIONS

The present application is a Continuation Application of U.S. application Ser. No. 16/132,732, filed on Sep. 17, 2018, which is incorporated by reference herein in its entirety.

FIELD

The present subject matter relates generally to wind turbine rotor blades and, more particularly, to a jointed blade with a system for supplying heat to the tip blade segment separately from the root blade segment.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material joined together along the leading and trailing edges of the blade. Internal support structure, such as spar caps and shear webs, provide the structural properties to the blade (e.g., stiffness, buckling resistance, and strength) needed for the blade to withstand the bending moments and other loads exerted on the rotor blade during operation.

In recent years, wind turbines for wind power generation have significantly increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a beam structure extending lengthways that structurally connects with a receiving section in a second blade segment. The beam structure forms a portion of the internal support structure for the blade and includes a shear web connected with a suction side spar cap and a pressure side spar cap. Multiple bolt joints are used to connect the beam structure with the receiving section in the second blade segment, including a span-wise bolt on the end face of the beam and at least one chord-wise bolt through the beam structure spaced from the joint line between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections. The spar bridge may be an extension of one of the spar sections that is received in a receiving spar section of the other blade portion. This configuration also uses a threaded bolt extending from the end face of the spar to connect and tension the spar in the receiving spar section.

Jointed wind turbine blades are, however, just as susceptible to icing as conventional blades. Under certain combinations of atmospheric conditions, the rotor blades can become covered with ice. For an operational wind turbine, ice buildup typically occurs on the leading edge of the blade, resulting in a modified airfoil shape and reduced lifting capability. As the ice layer becomes increasingly thick, weight is added to the airfoil, further reducing the lifting capability and the aerodynamic performance of the rotor blade. Ice shedding (the throwing off of ice as the blades rotate) can also be a safety issue, particularly for wind turbines located near residential areas. For wind turbines that are stopped or idling, ice will generally form uniformly over the entire surface of the blades, thereby necessitating deicing of the entire blade before the wind turbine can be placed back in operation.

Methods and devices are known and practiced for deicing wind turbine rotor blades, which include preventing icing on the rotor blades when atmospheric conditions are favorable for ice formation. For example, installing resistive heating wires or other electrical conductors onto the leading edge or other surfaces of the rotor blade is known. The Canadian patent CA 2228145 (counterpart to EP 0842360 B1) describes a system for deicing wind turbine rotor blades wherein a heated medium, which may be the air within the blade cavity, is channeled to internal cavities within the blade. The heated medium is directed from the blade root area into a cavity behind the leading edge of the blade, and then diverted at the blade tip into a cavity along the trailing edge of the blade and back to the root area. A fan with integrated heating elements is provided in the blade root to generate and maintain circulation of the heated medium. The chambers or cavities may be defined by reinforcement ribs that run parallel to the longitudinal axis of the blade.

The tip section is the area of the blade most susceptible to icing, and heating systems have been devised to improve upon conventional systems (like that described in the CA 2228145 patent) wherein the warmest air is not directed to the tip of the blade first, but along the entire length of the leading edge before reaching the blade tip. Reference is made, for example, to US Patent Application Publication 2015/0056074 for improved system designs that adequately supply heated air into the tip section of the blade.

US Patent Application Publication 2017/0314536 describes a deicing system for a wind turbine blade that utilizes an air heating system and an independently controlled electric heating system, wherein the electric system uses a heating element disposed on the leading edge of the blade adjacent to the blade tip.

Jointed wind blades, however, use various configurations of internal spar structure at the chord-wise joint. This structure is an impediment to the flow of a heating medium into the tip segment, or a continuous heating element (e.g., a resistance mat or web) across the joint structure.

Therefore, an improved heating system is needed for a jointed blade that can adequately supply the tip segment of the blade with heat for deicing capability.

BRIEF DESCRIPTION

Aspects and advantages of the invention will be set forth in part in the following description, or may be obvious from the description, or may be learned through practice of the invention.

In one aspect, the present disclosure is directed to a jointed wind turbine rotor blade with an improved heating system to deliver adequate deicing heat to the tip-end blade segment. The blade includes a first blade segment and a separate second blade segment. Each of the first and second blade segments has a pressure side shell member and a suction side shell member. The blade segments are joined together at a chord-wise joint that may be located closer to the tip end of the blade than the root end. For example, the chord-wise joint may be at approximately 10 meters from the blade tip for a blade in excess of 50 meters in span-wise length. Internal joint structure joins the first and second blade segments across the chord-wise joint. This joint structure is not limited to a particular configuration, and various such structures are taught and known in the art. A first heating system is configured within the first blade segment, and a second heating system is configured within the second blade segment.

In a particular embodiment, the first blade segment is adjacent a root end of the wind turbine blade and the second blade segment is adjacent is adjacent a tip end of the wind turbine blade. It should be appreciated that the invention encompasses a wind turbine blade with multiple blade segments, wherein the chord-wise joint in accordance with aspects of the invention is provided between the multiple blade segments.

A disconnectable coupling is configured between the first and second blade segments at the chord-wise joint, wherein the coupling is configured to supply power or a fluid medium from the first blade segment across the chord-wise joint for use by the second heating system in the second blade segment. The type of coupling will depend on the fluid medium or power requirements. For example, if the fluid medium is a heated liquid, various fluid couplings (including quick-disconnect couplings) are readily available for connecting a conduit in the first blade segment to a conduit in the second blade segment in order to convey the liquid from a heat source in the first blade segment to a heat exchanger in the second blade segment, and to return the liquid to the heat source in a closed-loop configuration. The couplings are connectable and disconnectable via any manner of suitable configurations. For example, the couplings may include threaded fittings, pressure fittings, latching members, and so forth. Electrical couplings may include plug/socket connectors, pin connectors, terminal board connectors, and so forth.

In a particular embodiment, the first and second heating systems are independently controllable. For example, a separate controller, heat source, motive means, and so forth, may be provided in the first blade segment for each of the first and second heating systems. In another embodiment, the first and second heating systems may be commonly controlled. For example, the second heating system may be an operational extension of the first heating system and utilize the same heated medium, motive means, controller, and so forth.

In a certain embodiment, the internal joint structure includes a beam structure or member that extends span-wise from one of the blade segments into a receiving section formed in the other blade segment, wherein the coupling is configured with the beam structure and receiving section. For example, the coupling may be configured across an external surface of the receiving section and an external surface of the beam structure at the chord-wise joint. In another embodiment, the coupling may be configured through the receiving section and into the beam structure, wherein the power or fluid medium is conveyed through an internal conduit in the beam structure into the second blade segment.

In still another embodiment, the internal joint structure may include one or more chord-wise walls separating the first and second blade segments at the chord-wise joint, wherein the coupling includes one or more disconnectable conduits for the power or fluid medium through the chord-wise walls.

In an embodiment of particular heating systems, the first heating system may be a hot air heating system configured within the first blade segment, and the second heating system may be an electrical heating system configured within the second blade segment. The coupling may be a disconnectable electrical coupling between a power source in the first blade segment and a heating element in the second blade segment.

With an embodiment wherein the heating system in the second blade segment is electrical, "coupling" may also encompass a power cord that is sufficiently long to extend from the power source in the first blade segment, through the joint structure, and connect to a heating element in the second blade segment. Thus, this "coupling" is disconnectable (can disconnect from the power source or the heating element) and serves to connect the power source in the first blade segment to the heating element in the second blade segment.

In another embodiment, the first heating system is a hot air heating system configured within the first blade segment, and the second heating system is a hot air heating system within the second blade segment. The coupling may include disconnectable ducting that supplies hot air across the chord-wise joint and into the second blade segment. This hot air may be supplied from the same source that supplies the first heating system, or may be from a separate dedicated source for the second blade segment. With this embodiment, the internal joint structure may include a beam structure extending span-wise from one blade segment (e.g., the second blade segment) into a receiving section formed in the other blade segment (e.g., the first blade segment), where the beam structure and receiving section define a blockage that prevents the hot air from being conveyed into the second blade segment through the receiving section and beam structure. The ducting defines a bypass around the blockage and into the second blade segment. For example, the beam structure may be an extension of the spar structure in the second blade segment, and the ducting may define a path for the hot air into a spar structure within the second blade segment.

The jointed wind turbine blade may further include a lightning strike conductor that bridges the chordwise joint and connects blade tip receptors to a blade root grounding system, wherein the conductor includes an in-line disconnectable coupling at the chordwise joint.

The present invention also encompasses a wind turbine that utilizes one or more of the jointed wind turbine blades embodied herein.

Still further, the present invention encompasses a method for supplying heat for deicing in a jointed wind turbine rotor blade, wherein the blade includes a first blade segment adjacent a root end of the wind turbine rotor blade, a second blade segment adjacent a tip end of the wind turbine rotor blade, and internal joint structure joining the first and second blade segments across a chord-wise joint that separates the first and second blade segments. The method includes configuring a first heating system within the first blade segment, and configuring a second heating system within the second blade segment. A disconnectable coupling is configured between the first and second blade segments at the chord-wise joint. The method includes supplying power or a fluid medium from the first blade segment, through the coupling, and across the chord-wise joint for use by the second heating system in the second blade segment.

Various method embodiments include any combination of the aspects discussed above and set forth in greater detail below.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine that may utilize a jointed wind turbine blade according to the present disclosure;

FIG. 2 illustrates a rotor blade having a first blade segment and a second blade segment, and joint structure that connects the blade segments;

FIG. 3 is a perspective view of an embodiment of a blade segment with joint structure that includes a beam member;

FIG. 4 is a perspective view of an embodiment of a blade segment with joint structure that includes a receiving section;

FIG. 5 is a partial cut-away view of an embodiment of a jointed wind turbine blade with heating systems;

FIG. 6 is a partial cut-away view of another embodiment of a jointed wind turbine blade with heating systems;

FIG. 7 is a partial cut-away view of still a different embodiment of a jointed wind turbine blade with heating systems;

FIG. 8 is a top diagram view of an embodiment of joint structure and a coupling in accordance with aspects of the present invention;

FIG. 9 is a top diagram view of another embodiment of joint structure and a coupling; and FIG. 10 is a top diagram view of still a different embodiment of joint structure and a coupling.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned, the present subject matter is directed generally to jointed wind turbine rotor blades having an improved heating system for delivering adequate deicing capability to the tip-end blade segment.

Referring now to the drawings, FIG. 1 is a side view of an exemplary wind turbine 10 that may use jointed wind turbine rotor blades in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 includes a blade tip 17 to a blade root 19.

Referring to FIGS. 2 and 3, a jointed rotor blade 28 is depicted having a first blade segment 32 and a second blade segment 30 in accordance with aspects of the present technology. As mentioned, the jointed rotor blade 28 may include more than two blade segments. The first blade segment 32 and the second blade segment 30 extend in opposite directions from a chord-wise joint line 34. Each of the blade segments 30, 32 includes a pressure side shell member 31 and a suction side shell member 33. The first blade segment 32 and the second blade segment 30 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the first blade segment 32.

In the depicted embodiment, the second blade segment 30 is a tip-end blade segment, and the first blade segment 32 is a root-end blade segment. Joint structure is provided between the blade segments 30, 32. The invention is not limited to any particular type of joint structure. In a particular embodiment depicted in the figures, the second blade segment 30 includes a beam structure 40 that forms a portion of the internal support structure 36 and extends lengthways (e.g., span-wise) for structurally connecting with the internal support structure 36 in the first blade segment 32. The beam structure 40 may be integrally formed with the second blade segment 30 as an extension protruding from a spar section 42, thereby forming an extended spar section. The beam structure 40 includes at least one interconnecting web 44 (e.g., a shear web) connected with a suction side spar cap 46 and a pressure side spar cap 48. In the illustrated embodiments, the beam structure 40 is formed as a box-type structure having opposite interconnecting webs 44.

The second blade segment 30 may include one or more first bolt joints (also referred to as "pins") towards a first end 54 of the beam structure 40. For example, a bolt 52 may be located on the end 54 of the beam structure 40 and oriented in a span-wise direction. The second blade segment 30 may also include a bolt joint slot 50 oriented in a chord-wise direction and located on the beam structure 40 at a distance E from the chord-wise joint 34 and a distance D to the end 54 of the beam structure 40. There may be a bushing within the bolt joint slot 50 arranged in a tight interference fit with a bolt tube or pin 53 used to connect the second blade segment 30 to first blade segment 32. It should be appreciated that any combination of bolt tubes 52, 53 and bolt slots 50 may be configured between the beam structure 40 and a receiving section 60 (FIG. 4) for the purpose of interconnecting the first 32 and second 30 blade segments.

In FIG. 4, the internal support structure 36 includes a receiving section 60 extending lengthways (span-wise) within the first blade segment 32 for receiving the beam structure 40 of the second blade segment 30. The receiving section 60 includes multiple spar structure components 66 that extend lengthways for connecting with the beam structure 40 of the second blade segment 30 along a length of the receiving section 60. Although not depicted in FIG. 4, it is readily understood that the receiving section 60 includes any combination of bolt slots 50 or bolts 52, 53 for interconnecting with corresponding bolts or slots of the beam structure 40. For example, a bolt slot is configured in a distal end (away from the chord-wise joint 34) of the receiving section 60 for receipt of the bolt 52 provided on the end 54 of the beam structure 40.

It should be appreciated that the internal joint structure this is for explanation purposes only, and that the internal joint structure 36 may be reversed such that the beam structure 40 is configured with the first blade segment 32 and the receiving section 60 is configured with the second blade segment 30.

Referring to FIG. 5, a jointed wind turbine blade 28 is shown with a first heating system 100 is configured within the first blade segment 32, and a second heating system 102 is configured within the second blade segment 30. The blade 28 includes a leading edge 74 and a trailing edge 76, as well as a root portion 19, and a tip portion 17. The blade 28 extends in a longitudinal, span-wise direction and, as is well known in the art, the upper shell member 31, 33 (FIG. 4) are joined together at the leading edge 74 and trailing edge 76. The blade 28 includes an internal cavity in which various structural members, such as spar caps 46, 48 (FIG. 3) and shear webs are configured. The construction and function of the internal structural components of the blade 28 are well known to those skilled in the art and need not be described in detail herein for an understanding and appreciation of the present invention.

In the depicted embodiment of FIG. 5, the first heating system 100 is a hot air heating system and includes any manner of structural members 70, such as webs 78, 80, walls, ducts, baffles, dampers, and so forth, disposed within the internal volume of the rotor blade 28. The webs 78, 80 may correspond to the shear webs. In this embodiment, these members define a middle circulation channel that is common to a leading edge fluid circulation loop and a separate trailing edge fluid circulation loop, as indicated by the flow arrows in the figure. In an alternate embodiment, a single, continuous flow path could be established wherein the leading and trailing edge flows are serial (one-after-the-other) within the single loop.

The first heating system 100 is disposed within the internal volume of the rotor blade 28 and is configured with the structural members 70 so as to direct a heated fluid medium (e.g., air) simultaneously through the leading edge and trailing edge fluid circulation loops. This system 100 may include any combination of air handling components, such a one or more fans, heater elements, dampers, ducts, and the like. In the embodiments depicted in the various figures, the first heating system 100 includes a fan heater 82, which is intended to encompass any configuration of a fan and heating elements. For example, the fan heater 66 may include a fan, one or more diffusers/ducts, and heating element within the same housing or separate housings. The heating elements may be resistive elements, and any other suitable heating element or system.

It should be appreciated that the first heating system 100 is not limited to a single flow direction through the leading and trailing edge circulation loops. For example, in the embodiment of FIG. 5, the fan heater 82 is disposed so as to direct a heated outflow airstream along the middle circulation channel to an area adjacent walls or other structure at the blade joint 34. From there, the outflow airstream is directed into separate return airstreams or legs of the respective circulation loops that flow along the leading edge 74 and the trailing edge 76 channels and back to the blade root 19, thereby establishing the counter-rotating flow path loops depicted in the figure.

Still referring to the embodiment of FIG. 5, the second heating system 102 is an electrical system that includes a resistive heating element 122, such as a heating pad or mat, disposed within the internal volume of the second blade segment 30 along the leading edge 74. The heating element 122 is supplied with power from an electric power source 120 located in the blade root 19. The power source 120 may include a controller for controlling the second heating system 102 separate from the first heating system 100. A supply conduit or line 114 delivers power from the source 120 to the chord-wise joint 34.

A disconnectable coupling 104 is configured between the first and second blade segments 32, 30 at the chord-wise joint 34, wherein the coupling 104 is configured to supply the electrical power (or a fluid medium in other embodiments) from the first blade segment 32 across the chord-wise joint 34 for use by the second heating system 102 in the second blade segment 30. In the embodiment of FIG. 5, the coupling 104 is specifically provided as an electrical coupling between the supply line 114 and the heating element 122. Various types of electrical couplings are well-known and may be used in the present system, such as plug/socket connectors, pin connectors, terminal board connectors, and so forth. Components of the coupling 104 may be housed in respective junction boxes 106 configured at the chord-wise joint 34 that structurally support and protect the coupling 104.

Alternatively, the power supply line or conduit 114 may be configured as a power cord that is sufficiently long to extend from the power source 120 in the first blade segment 32, through the joint structure and chord-wise joint 34, and connect to the heating element 122 in the second blade segment 30.

It should be appreciated that the type of coupling 104 will depend on the fluid medium or power requirements of the second heating system 102. The coupling 104 is preferably disconnectable with minimal tool requirements, and may be manually disconnectable. For example, the coupling 104 may be a manually releasable quick-disconnect coupling 104.

FIG. 5 also depicts that the jointed blade 28 may include a lightning strike conductor 150 that connects with a plurality of lightning receptors 152 disposed span-wise along the blade segments 32, 30 and embedded or otherwise incorporated in the shell components. The conductor 150 is connected to a blade root grounding system 154 that grounds the receptors 152, as is well-known to those skilled in the art and does not require a detailed explanation herein. A disconnectable coupling 156 is configured in-line with the conductor 159 at the chord-wise joint 34. This coupling 156 may be any manner of conventional quick-disconnect coupling specifically designed for electrical conduction lines.

FIG. 6 depicts an embodiment wherein the second heating system 102 is configured as a heated liquid system wherein a heated liquid is conveyed from a heat source 120 in the root 19 through a supply conduit 114 to the liquid coupling 104 at the chord-wise joint 34. The liquid coupling 104 connects with a heat exchanger mat or pad 132 disposed within the second blade segment 30 along the leading edge 74. After passing through the heat exchanger mat 132, the cooled liquid is conveyed through the coupling 104 to a return conduit 115 in the first blade segment 32 in a closed-loop system. The liquid coupling 104 includes separate coupling components for the supply 114 and return 115 conduits, and may threaded fittings, pressure fittings, latching members, and so forth.

FIG. 7 depicts an embodiment wherein the first heating system 100 is a hot air heating system configured within the first blade segment 32, and the second heating system 102 is a hot air heating system within the second blade segment 30. The coupling 104 may include disconnectable ducting that supplies hot air across the chord-wise joint 34 and into a conduit, baffling, or other directional structure in the second blade segment 30. This hot air may be supplied from a separate dedicated source 134 and supply duct or channel 124 for the second blade segment 30. Alternatively, the second heating system 102 may be an operational extension of the first heating system 100 and utilize the same heated medium, motive means, controller, and so forth. For example, the coupling 104 may be configured at the end of the central channel from the same source 82 that supplies the first heating system 100.

Referring to FIG. 8, in a certain embodiment, the internal joint structure 36 includes a beam structure or member 40 that extends span-wise from one of the blade segments (in this case, the second blade segment 30) into a receiving section 60 formed in the other blade segment (in this case, the first blade segment 32), wherein the coupling 104 is configured with the beam structure 40 and receiving section 60. The joint structure 36 (particularly the end 54 of the beam 40 and wall 63 delimiting the receiver section 60) essentially defines a blockage 128 that prevents a heated medium, such as hot air, from being conveyed directly into the second blade segment 30 through the receiving section 60 and beam structure 40. The coupling 104 defines a bypass 126 around the blockage 128. For example, in FIG. 8, the coupling 104 may be configured across an external surface 108 of the receiving section 60 and an external surface 110 of the beam structure 40 at the chord-wise joint 34 to interconnect the supply line or conduit 114 in the first blade segment 32 with the conduit or line 144 in the second blade segment 30 that supplies the second heating system.

FIG. 9 depicts an embodiment the coupling 104 is configured through the external wall 108 of the receiving section 60 and into an interior of the beam structure 40. The coupling 104 includes mating components on an interior wall 111 of the beam structure 40, wherein the power or fluid medium is conveyed through an internal conduit 112 in the beam structure 40 into the second blade segment 30. In this embodiment, the beam structure 40 may be an extension of the spar structure 66 running span-wise through the second blade segment 30. Again, this configuration defines a bypass 126 around the blockage 128.

FIG. 10 depicts an embodiment the internal joint structure 36 includes one or more chord-wise walls 116 separating the first 32 and second 30 blade segments at the chord-wise joint 34. The coupling 104 includes one or more disconnectable conduits 118 for the power or fluid medium from the supply 114 in the first blade segment 30, through the chord-wise walls 116, and to the supply line or conduit 144 in the second blade segment 30.

It should be appreciated that the present invention also encompasses a wind turbine 10 (FIG. 1) that utilizes one or more of the jointed wind turbine blades 28 embodied herein.

It is also understood that the present invention encompasses a method for supplying heat for deicing in a jointed wind turbine rotor blade 28, wherein the blade 28 includes a first blade segment 32 adjacent a root end 19 of the wind turbine rotor blade, a second blade segment 30 adjacent a tip end 17 of the wind turbine rotor blade, and internal joint structure 36 joining the first 32 and second 30 blade segments across a chord-wise joint 34 that separates the first and second blade segments. The method includes configuring a first heating system 100 within the first blade segment 32, and configuring a second heating system 102 within the second blade segment 30. A disconnectable coupling 104 is configured between the first 32 and second 30 blade segments at the chord-wise joint 34. The method includes supplying power or a fluid medium from a source 120 in the first blade segment 32, through the coupling 104, and across the chord-wise joint 34 for use by the second heating system 102 in the second blade segment 30.

Various aspects discussed above with respect to FIGS. 5 through 10 support additional method embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jointed wind turbine rotor blade, comprising:
    a first blade segment;
    a second blade segment;
    each of the first and second blade segments comprising a pressure side shell member and a suction side shell member;
    a chord-wise joint separating the first and second blade segments;
    internal joint structure joining the first and second blade segments across the chord-wise joint;
    a sole first heating system mounted within the first blade segment;
    a sole second heating system mounted within the second blade segment;
    a disconnectable coupling configured between the first and second blade segments at the chord-wise joint; and
    wherein the first heating system comprises a hot air heating system configured to deliver hot air within the first blade segment, and the second heating system comprises an electrical heating system configured to supply resistive heat within the second blade segment, the coupling comprising a disconnectable electrical coupling between a power source in the first blade segment and a heating element in the second blade segment, the disconnectable electrical coupling comprising a first member configured with the first blade segment that mates at the chord-wises joint with a second member configured with the second blade segment.

2. The jointed wind turbine rotor blade of claim 1, wherein the first blade segment is adjacent a root end of the wind turbine rotor blade, and the second blade segment is adjacent a tip end of the wind turbine rotor blade.

3. The jointed wind turbine rotor blade of claim 1, wherein the first and second heating systems are independently controllable.

4. The jointed wind turbine rotor blade of claim 1, wherein the internal joint structure comprises a beam structure extending span-wise from one of the first or second blade segments into a receiving section formed in the other of the second or first blade segment, the coupling configured across an external surface of the receiving section and an external surface of the beam structure at the chord-wise joint.

5. The jointed wind turbine rotor blade of claim 1, further comprising a lightning strike conductor that bridges the chordwise joint and connects blade tip receptors to a blade root grounding system, the lightning strike conductor comprising an in-line disconnectable connector at the chordwise joint.

6. The jointed wind turbine rotor blade of claim 1, wherein the internal joint structure comprises a beam structure extending span-wise from one of the first or second blade segments into a receiving section formed in the other of the second or first blade segment, the coupling configured through the receiving section and into the beam structure, wherein the power source is conveyed through an internal conduit in the beam structure.

7. The jointed wind turbine rotor blade of claim 1, wherein the internal joint structure comprises one or more chord-wise walls separating the first and second blade segments at the chord-wise joint, the coupling comprising one or more disconnectable conduits for the power source through the chord-wise walls.

8. A wind turbine, comprising one or more of the jointed wind turbine blades according to claim 1.

9. A method for supplying heat for deicing in a jointed wind turbine rotor blade, wherein the blade includes a first blade segment adjacent a root end of the wind turbine rotor blade, a second blade segment adjacent a tip end of the wind turbine rotor blade, and internal joint structure joining the first and second blade segments across a chord-wise joint that separates the first and second blade segments, the method comprising:
  mounting a sole first heating system within the first blade segment;
  mounting a sole second heating system within the second blade segment;
  configuring a disconnectable coupling between the first and second blade segments at the chord-wise joint;
  supplying a power source from the first blade segment, through the coupling, and across the interface at the chord-wise joint for use by the second heating system in the second blade segment; and
  wherein the first heating system is configured as a hot air heating system to supply heated air within the first blade segment, the second heating system is configured as an electrical heating system to supply resistive heat within the second blade segment, and the coupling is configured as a disconnectable electrical coupling between the power source in the first blade segment and a heating element in the second blade segment, the disconnectable electrical coupling comprising a first member configured with the first blade segment that mates at the chord-wise joint with a second member configured with the second blade segment.

10. The method of claim 9, wherein the internal joint structure includes a beam structure extending span-wise from the second blade segment into a receiving section formed in the first blade segment, comprising configuring the coupling with the receiving section and the beam structure.

11. The method of claim 9, comprising conveying the power source across the chord-wise joint and into the second blade segment through an internal conduit in a beam structure.

\* \* \* \* \*